Patented Nov. 13, 1945

2,388,904

UNITED STATES PATENT OFFICE 2,388,904

METHOD OF MAKING CEREAL PRODUCT

Ferdinand A. Collatz, St. Paul, Minn., assignor to General Mills, Inc., a corporation of Delaware No Drawing. Application January 30, 1943, Serial No. 474,167

6 Claims. (Cl. 99—82)

This invention relates to a cereal product of the ready to eat type and to the method of making the same.

An object of this invention is the provision of a ready to eat cereal product having a characteristic grain flavor and a delicate, friable structure.

Another object is to provide a method for making such a product.

These and other objects, as will hereinafter appear, are accomplished by this invention which is fully set forth in the following specification.

This is an improvement on the invention set forth in my Patent No. 2,162,376, granted June 13, 1939.

My invention consists mainly in preparing a farinaceous dough such as from corn meal or other suitable dough-forming ingredients, forming a dough therefrom, cooking the dough, forming the dough into pellets, flattening the pellets to form flakes and then expanding the volume of said flakes by explosive puffing such as is produced by subjecting them to heat and high pressure and suddenly discharging the flakes from a confined area of high pressure to an unconfined area at atmospheric pressure.

The following examples will serve to illustrate the invention. A blend of the following ingredients is prepared: approximately 88.5 parts of white corn cones (granular endosperm of white corn which has been degerminated), 3.0 parts of cane sugar, 2.0 parts of salt, 4.5 parts of tapioca flour, 3.0 parts of wheat germ, and .50 part of a mineral mixture comprising the following ingredients: 17.5%, by weight, of monosodium phosphate, 36.8%, by weight, of disodium phosphate, and 45.7%, of calcium carbonate. The mixture is then fed to a cooking chamber, and sufficient water is added thereto to form a dough of the desired consistency.

The dough is mixed and kneaded while being cooked, at a temperature of about 212° F. After being cooked, the dough is forced from the cooking chamber through an extruding die of a desired diameter and having a knife operatively associated therewith to sever the extruded material to form pellets of appropriate length. The dough cooker and extruder shown in James Patent No. 2,233,919 has been found to be highly satisfactory for this purpose. The pellets are dried at a controlled rate to provide a pellet having a moisture content of about 20 to 30%, by weight. The pellets are then flattened to form thick flakes which are then further dried to a moisture content of 11–16%, preferably about 14%.

The flakes, as formed above, are then placed in a suitable closed receptacle or "tempering bin" to permit equalization of moisture content throughout the mass of flakes. A charge of the flakes, as produced above, is then placed in a suitable revolving "puffing gun" which has been heated by any suitable means to a temperature of about 375° F. to 450° F. The gun is then closed by means of a suitable closure member or lid and is rotated at a speed of about 45 revolutions per minute. At the end of about 5½ to 6½ minutes, the pressure increases to about 80 to 110 pounds per square inch, and the rotation of the gun is stopped. The lid is suddenly released and the flakes are thereby permitted to expand or puff. If desired or necessary, the puffed flakes may be further dried so that the final product has a moisture content of about 4½% to 6%, by weight.

The following is a further example of the present invention. A blend of the following ingredients is made:

| | Parts |
|---|---|
| Corn cones | 86.1 |
| Sugar | 5.9 |
| Barley malt flour | 5.1 |
| Salt | 2.8 |
| Minerals and vitamins | .1 |

The blended mixture of these ingredients is fed into a cooker with 40 to 45 parts of water. They are mixed together to prepare a dough and the dough is cooked and extruded in much the same manner as in the previously described example. The extruded pellets are dried to a moisture content of between 14.5 and 15.5%, following which they are run through a pair of rolls where they are flattened to form flakes. These flakes are then dried to a moisture content of 11 to 12% and are then permitted to temper to distribute the moisture uniformly. After tempering they are puffed in a manner similar to that previously described.

My improved process is applicable to the treatment of any type of cooked dough. For example, instead of using corn cones or coarsely ground meal, other flours or meals such as those made from wheat, oats, rice or combinations thereof may be used. The term "farinaceous" as used in the claims is intended to include these and other cereals. It will, of course, be understood that the composition and amount of ingredients of my cereal product may be varied in numerous ways.

The product produced according to this invention is unique in shape and is superior in flavor and eating qualities. It is a crisp, pliable, crunchy cereal which readily disintegrates during mastication and yet does not become soggy in milk or cream within the period prior to seating.

While the invention has been described in detail with specific examples, such examples are illustrative and are not given as limitations since other modifications within the spirit and scope of the invention will be apparent to those skilled in the art. For example, the composition of the dough and its moisture content may be varied widely. Likewise, the moisture content of the pellets at the time of flaking and of the flakes at the time of puffing as well as the conditions of puffing may be altered considerably as understood by those skilled in the art. For example, the pellets may be flattened as they come from the extruder or they may be flattened after they have been dried down to a suitable puffing moisture content, or at any moisture content between these. Usually, however, a moisture content near that desirable for puffing is preferred as it has a beneficial effect on the eating qualities of the product. Any suitable puffing moisture content may be employed; usually, however, this will range between 11 and 16%. Puffing may be performed under any suitable conditions. Usually, however, it will involve a pressure of 80 to 110 lbs., per square inch gauge at temperatures substantially within the range of 375° F. to 450° F. Furthermore, the degree of flattening of the pellets may vary, usually however it is preferable to flatten them to a thick flake. It is to be understood, therefore, that the invention is not to be limited by any specific illustrations but may be varied within the scope of the appended claims.

I claim as my invention:

1. The process of producing an edible cereal product which comprises forming a dough from water and a farinaceous material, cooking the dough, forming the cooked dough into pellets, flattening the pellets, and explosively puffing the flattened pellets whereby they expand substantially in size.

2. The process of producing an edible cereal product which comprises forming a dough from water and a farinaceous material, cooking the dough, forming the cooked dough into pellets, partially drying the pellets, flattening them, and explosively puffing the flattened pellets at a puffing moisture content.

3. The process of producing an edible cereal product which comprises forming a dough by the addition of water to a farinaceous material, cooking the dough at a temperature approximating the boiling point of water, forming the dough into pellets, cooling and partially drying the pellets, subjecting them to pressure to flatten them, further drying them to a moisture content substantially within the range of 11% to 16%, by weight, and explosively puffing the flattened pellets.

4. The process of producing an edible cereal product which comprises forming a dough by the addition of water to a farinaceous material, cooking the dough, forming the dough into pellets, partially drying the pellets, flattening them to form flakes, further drying the pellets to a moisture content suitable for explosive puffing and explosively puffing the flattened flakes.

5. The process of producing an edible cereal product which comprises forming a dough by the addition of water to a farinaceous material, cooking the dough at a temperature approximating the boiling point of water, extruding the cooked dough to form pellets, partially drying the pellets, subjecting them to pressure to flatten them, further drying the extruded material to a moisture content substantially within the range of 11% to 16%, by weight, subjecting the extruded material to a pressure substantially within the range of 80 to 100 pounds per square inch at temperatures substantially within the range of 375° F. to 450° F., and suddenly releasing the pressure and thereby permitting the extruded material to expand in size.

6. The process of producing an edible cereal product which comprises forming a dough by the addition of water to a farinaceous material composed largely of white corn cones, cooking the dough, forming the cooked dough into pellets, partially drying the pellets, subjecting them to pressure to flatten them, further drying the flattened pellets to a moisture content suitable for puffing.

FERDINAND A. COLLATZ.